Jan. 6, 1925.    1,521,625
J. I. HOKE
TRACTOR
Filed March 5, 1920
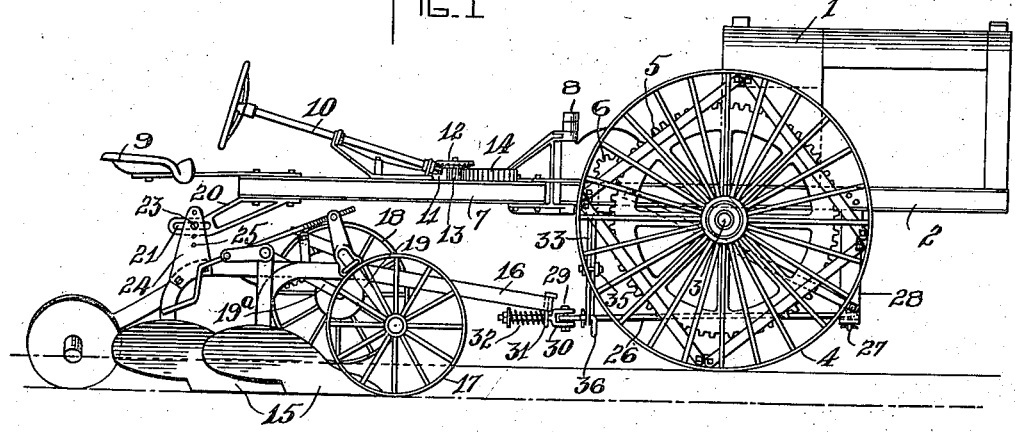
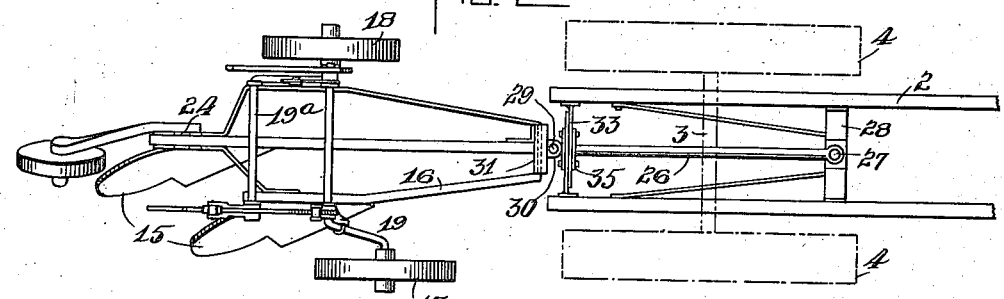
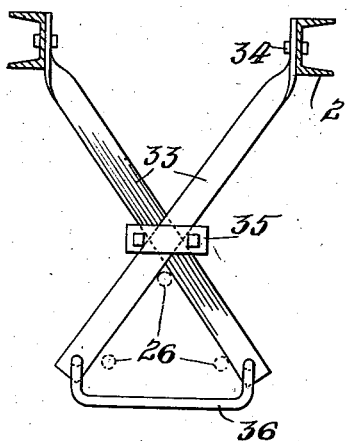
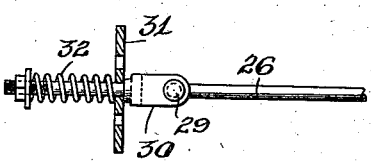
INVENTOR.
John I. Hoke
BY
his ATTORNEYS.

Patented Jan. 6, 1925.

1,521,625

UNITED STATES PATENT OFFICE.

JOHN I. HOKE, OF MEDINA, NEW YORK, ASSIGNOR TO MOLINE PLOW COMPANY, INC., OF MOLINE, ILLINOIS, A CORPORATION OF VIRGINIA.

TRACTOR.

Application filed March 5, 1920. Serial No. 363,372.

*To all whom it may concern:*

Be it known that I, JOHN I. HOKE, a citizen of the United States, and resident of Medina, in the county of Orleans and State of New York, have invented certain new and useful Improvements in Tractors, of which the following is a specification.

The present invention relates to tractors and more particularly to the type in which an agricultural implement such for instance as a plow is employed, in connection with the tractor, an object of this invention being to so mount the agricultural implement upon the tractor that the driven part of the tractor may partake of movements independently of the agricultural implement and slight movements of the agricultural implement will not be imparted to the driven part of the tractor.

To these and other ends the invention consists of certain parts and combinations of parts, all of which will be hereinafter described, the novel features being pointed out in the appended claims.

In the drawings:

Fig. 1 shows in side elevation a tractor embodying the present invention;

Fig. 2 is a fragmentary view showing the connection between the agricultural implement and the driven part of the tractor;

Fig. 3 is a detail view of the sustaining means for the connection between the driven part of the tractor and the agricultural implement; and Fig. 4 is a fragmentary view of the connection between the driven part of the tractor and the agricultural implement.

In the embodiment herein illustrated, the forward part of the tractor embodies a motor housed in the casing 1 and supported by a frame 2 which is mounted on an axle 3 carrying the two ground wheels 4 which are driven through a gear 5 connected with a pinion 6 operated by the motor, thus providing a two wheeled motor driven forward part. Connected to the forward motor driven part is a trailing part, in this instance embodying a frame 7 pivoted at 8 to turn about an upright axis on the frame 2 of the forward driven part. This frame 7 may carry at its rear a seat 9 and may also support a steering shaft 10 which, through a pinion 11, meshes with a crown gear 12 on a stub shaft carrying a gear 13 meshing with a segmental gear 14 on the frame 2. The trailing part also embodies in this instance, an agricultural implement such as a plow which in this form has two plow shares 15 supported from a frame 16 which in turn is mounted upon two wheels 17 and 18 mounted on two cranked axles 19 and 19ª which permit the wheels to be adjusted vertically with reference to the plow frame and to each other so as to raise and lower the plow shares. The frame of the plow or agricultural implement is loosely connected to the swinging frame 7, this preferably being secured by providing the frame 7 with a downwardly and rearwardly projecting arm 20 horizontally slotted at 21 and having a bolt 23 passed therethrough. This bolt is, in this instance, supported by two spaced blades 24 projecting upwardly from the rear portion of the frame 16 and having a plurality of openings 25 through any one of which the bolt 23 may be passed for the purpose of providing a vertical adjustment between the frame 7 and the frame of the agricultural machine.

An adjustable connection is provided between the frame of the agricultural implement and the forward motor driven part, this connection being such that the agricultural implement may be driven by the forward motor driven part and yet slight movements in the forward driven part or in the agricultural machine are not imparted to the other part. This connection in this instance, embodies a pull bar 26 pivoted on a vertical axis 27 in front of the axle 3 of the forward driven part, being preferably supported on a depending U shaped frame 28 which has its upper ends connected to the side bars of the frame 2. This pull bar extends rearwardly between the ground wheels 4 and has pivoted thereto at 29 substantially in vertical line with the pivoted connection between the frame 2 and the frame 7, a coupling member 30 which is yieldably mounted on the frame 16 preferably being guided in a plate 31 at the end of said frame and being acted upon by a helical spring 32.

With the end in view of preventing the frame of the agricultural machine swinging when the wheels are adjusted to elevate the plow shares out of contact with the ground, there may be provided two bars 33 secured at 34 to the side bars of the frame 2 and extended downwardly and inwardly so as to cross each other in the manner shown in Fig. 3, to provide a downwardly flaring guide. At their point of crossing a clip 35 connects them together while their free ends are connected by a U shaped cross piece 36. The connection 26 operates above the cross piece 36 and below the clip 35.

The operation of the machine will be understood from the foregoing, but it may be summarized as follows:

The motor driven part travels in front of the plow frame pulling the latter through the pull bar 26, the position of the plow with reference to the motor driven part being controlled through the steering shaft 10. During the operation of the tractor, the forward driven part will, through traveling on uneven ground, rock slightly, but this rocking action is not transmitted to the plow owing to the flexible connection between the plow frame and the frames 2 and 7. The plow will partake of slight deflecting movements and these movements will not be transmitted to the other portion of the tractor due to the flexible connections. When the tractor is traveling with the plow out of action, the plow frame is held against swinging by the flaring guide formed by the bars 33.

What I claim as my invention and desire to secure by Letters Patent is:

1. The combination with a tractor of a drawn device movable from a lowered or operating position to a raised or transport position and vice versa, draft connections between the drawn device and the tractor, and means carried by the tractor co-operating with the draft connections to restrict the movement of the draft connections when the drawn device is in its raised position, said means permitting freedom of movement of the draft connections when the drawn device is in its lowered or operating position.

2. The combination with a tractor of a drawn device movable from a lowered or operating position to a raised or transport position and vice versa, draft connections between the drawn device and tractor, and means carried by the tractor co-operating with the draft connections to prevent lateral swinging and upward movement of the draft connections when the drawn device is in its raised or transport position, said means permitting freedom of movement of the connections when the drawn device is in its lowered or operating position.

3. The combination with a tractor of a drawn device movable from a lowered or operating position to a raised or transport position and vice versa, the front end of said drawn device tending to raise first during the raising movement, draft connections between the drawn device and tractor, and means carried by the tractor co-operating with the draft connections to limit the upward movement of the draft connections as they are raised by the raising of the front end of the drawn device, said means permitting freedom of movement of the draft connections when the drawn device is in lowered position.

4. The combination with a tractor of a drawn device movable from a lowered or operating position to a raised or transport position and vice versa, draft connections between the tractor and drawn device free to move laterally and up and down when the drawn device is in lowered position, and means for guiding the draft connections to a central position and holding them against lateral and upward movement when the drawn device is raised to a transport position.

5. The combination with a tractor of an implement movable from a lowered or operating position to a raised or transport position and vice versa, draft connections pivoted to the tractor and connected to the implement, and means carried by the tractor located to the rear of the pivot of the draft connections to the tractor and serving to limit the upward movement of the draft connections when the implement is raised but permitting freedom of movement when the implement is lowered so that the draft connections are free to adjust themselves to the line of draft when the implement is in operating position, but will be held in position when the implement is raised.

6. The combination with a tractor of an implement movable from a lowered or operating position to a raised or transport position and vice versa, draft connections between the implement and tractor, and means carried by the tractor associated with the draft connections permitting them to swing freely when the implement is in operating position, but preventing swinging when the implement is in transport position, said means comprising a triangular shaped frame located so that the draft connections are held in the apex of the triangle when the implement is raised, but will be adjacent the base of the triangle when the implement is lowered.

7. The combination with a tractor of an implement movable from a lowered or operating position to a raised or transport position and vice versa, draft connections pivoted to the tractor and connected to the implement, and a triangular shaped loop to the rear of the pivot of the draft connections and through which the draft connections pass, said loop being located so that the draft connections will strike the apex of the loop when the implement is raised and will be adjacent the base of the loop when the implement is lowered.

8. The combination with a front wheel drive tractor having a rearwardly extending laterally swingable frame, of a drawn device loosely connected to said frame and adapted to be moved from a lowered or operating position to a raised or transport position, draft connections between the tractor and drawn device, and means carried by the tractor engaging the draft connections for restricting their movement when the drawn device is in raised position, said means permitting freedom of movement of the draft connections when the implement is in lowered position.

9. The combination with a two-wheel tractor having a rearwardly extending coupling frame pivoted to the tractor to swing about a vertical axis, of an implement movable from a lowered or operating position to a raised or transport position and vice versa, connections between the implement and coupling frame permitting the implement to have a limited movement relative to the coupling frame longitudinally and about a vertical axis and about a longitudinally horizontal axis, separate draft connections between the tractor and the implement for transmitting the draft of the tractor to the implement, and means carried by the tractor co-operating with the draft connections permitting freedom of movement of said draft connections when the implement is lowered, but serving to prevent upward and lateral swinging movement of the connections when the implement is in raised position.

10. The combination with a front wheel drive tractor having a rearwardly extending, laterally swingable frame, of an implement loosely connected to said frame, means for raising and lowering the implement, draft connections between the implement and tractor, and means associated with the draft connections permitting them to swing freely when the implement is lowered, but preventing swinging when the implement is raised, said means comprising a triangular-shaped frame located so that the draft connections are held in the apex of the triangle when the implement is raised, but will be adjacent the base of the triangle when the implement is lowered.

JOHN I. HOKE.